(12) United States Patent
Camparo et al.

(10) Patent No.: US 11,493,636 B2
(45) Date of Patent: Nov. 8, 2022

(54) MASTER/SLAVE ENSEMBLING FOR SATELLITE-SYSTEM TIMEKEEPING

(71) Applicant: The Aerospace Corporation, El Segundo, CA (US)

(72) Inventors: James Camparo, Redondo Beach, CA (US); Travis Driskell, Santa Monica, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 341 days.

(21) Appl. No.: 16/751,028

(22) Filed: Jan. 23, 2020

(65) Prior Publication Data

US 2021/0231813 A1 Jul. 29, 2021

(51) Int. Cl.
*G01S 19/02* (2010.01)
*H04L 7/00* (2006.01)

(52) U.S. Cl.
CPC ............ *G01S 19/02* (2013.01); *H04L 7/0008* (2013.01)

(58) Field of Classification Search
CPC .......... G01S 19/02; G01S 19/03; G01S 19/04; G01S 19/05; G01S 19/23; G01S 19/235; G01S 19/28; G01S 19/39; G01S 19/48; H04L 7/0008; H04L 7/0016; H04L 7/002; H04L 7/0025; H04L 7/0029; H04L 7/0033; H04L 7/0037; H04L 7/0041; H04L 7/0079; H04L 7/0083; H04B 7/2125; H04B 7/19; H04J 3/0658
See application file for complete search history.

(56) References Cited

U.S. PATENT DOCUMENTS

| | | | | |
|---|---|---|---|---|
| 4,472,720 A | * | 9/1984 | Reesor | G01S 5/02 |
| | | | | 342/356 |
| 5,506,781 A | * | 4/1996 | Cummiskey | H04B 7/2125 |
| | | | | 342/356 |
| 10,884,132 B1 | * | 1/2021 | Judd | G01S 19/42 |

(Continued)

OTHER PUBLICATIONS

Bloch et al., "History and performance of FEI space-class oscillators," Proc. 40th Annual Precise Time and Time Interval (PTTI) Meeting, Institute of Navigation, Manassas, VA, pp. 29-50 (2008).

(Continued)

*Primary Examiner* — Erin F Heard
*Assistant Examiner* — Kenneth W Good
(74) *Attorney, Agent, or Firm* — Snell & Wilmer LLP (57) ABSTRACT

Time-synchronization of a space-system having a plurality of satellites. During a first period, a first satellite of the plurality of satellites is designated as a master satellite. A clock of the master satellite is configured to provide time and frequency to remaining satellites of the plurality of satellites and the remaining satellites are designated as slave satellites. During a second period, a second satellite of the slave satellites is designated as the master satellite based on a performance indicator and the first satellite is designated as a slave satellite. During the first period and the second period, clocks of the slave satellites are crosslinked with a clock of the master satellite using time transfer. At least one satellite during the first period and the second period, delivers time data having the time and the frequency generated by a clock of the at least one satellite.

23 Claims, 9 Drawing Sheets

(56) References Cited

U.S. PATENT DOCUMENTS

| | | | | |
|---|---|---|---|---|
| 2012/0069943 A1* | 3/2012 | Lim | ............... | H04J 3/0641 |
| | | | | 375/371 |
| 2013/0065514 A1* | 3/2013 | Whelan | ............... | G01S 13/765 |
| | | | | 455/13.2 |
| 2013/0096825 A1* | 4/2013 | Mohanty | ............... | H03B 5/30 |
| | | | | 701/472 |
| 2017/0126234 A1* | 5/2017 | Isohata | ............... | H03B 5/32 |

OTHER PUBLICATIONS

Camparo et al., "Precise time synchronization of two Milstar communications satellites without ground intervention," *Int. J. Sat. Commun.*, 15:135-139 (1997).

Camparo et al., "Space-system timekeeping in the presence of solar flares," *IEEE Aerospace & Electron. Systems Mag.*, 19(5):3-8 (2004).

Camparo, "The rubidium atomic clock and basic research," *Physics Today*, 60(11):33-39 (2007).

Cash et al., "Microsemi chip scale atomic clock (CSAC) technical status, applications, and future Plans," *Proc. 2018 European Frequency and Time Forum*, IEEE Press, Piscataway, NJ, pp. 65-71 (2018).

Gardner et al., "A second look at chip scale atomic clocks for long term precision timing four years in the field," *Proc. Oceans 2016 MTS/IEEE*, Monterey, CA, Sep. 19-23, 2016.

Griggs et al., "Short-term GNSS satellite clock stability," *Radio Sci.*, 50:813-826 (2015).

Iyanu et al., "Pressure sensitivity of the vapor-cell atomic clock," *IEEE Trans. Ultrason., Ferroelec., and Freq. Control*, 56(6):1139-1144 (2009).

Kitching, "Chip-scale atomic devices," *Appl. Phys. Rev.*, 5:031302 (2018).

McClelland et al, "Development of a rubidium frequency standard for the MILSTAR satellite system," *Proc. 41st Frequency Control Symposium*, IEEE Press, Piscataway, NJ, pp. 66-74 (1987).

Muri et al., "A survey of communication sub-systems for intersatellite linked systems and CubeSat missions," *J. Commun.*, 7(4):290-308 (2012).

Poghosyan et al., "CubeSat evolution: Analyzing CubeSat capabilities for conducting science missions," *Prog. Aerospace Sci.*, 88:59-83 (2017).

Reid et al., "Broadband LEO constellations for navigation," *J. Inst. Nav.*, 65(2):205-220 (2018).

Wang et al., "Spacecraft atomic clock flight simulation and test station," *Proc. 43rd Annual Precise Time and Time Interval (PTTI) Systems and Applications Meeting*, Institute of Navigation, Manassas, VA, pp. 341-352 (2011).

\* cited by examiner

MASTER/SLAVE ENSEMBLING FOR SATELLITE-SYSTEM TIMEKEEPING

STATEMENT OF GOVERNMENT INTEREST

This invention was made with government support under Contract No. FA8802-19-C-0001. The government has certain rights in the invention.

FIELD

The subject matter described herein relates to enhanced techniques for satellite-system timekeeping.

BACKGROUND

Global Navigation Satellite Systems (GNSS) such as the Global Positioning System (GPS), Galileo, Glonass, and BeiDou are examples of precise atomic timekeeping in space. Spacecraft time must be accurately maintained between ground-station updates of the orbital assets such as satellites. For GNSS, timekeeping typically needs to be maintained at the tens of nanoseconds level if positioning errors are to be kept to meters, which necessitates fairly frequent ground-station updates of the constellation. There are, however, other space systems where precise atomic timekeeping is important such as communication satellite systems and CubeSat systems. Though timekeeping at the nanosecond level may not be required for these satellite constellations, microsecond timekeeping is likely more than sufficient.

To improve the timekeeping performance of a system of clocks and lengthen update intervals, different approaches can be used. With one example approach, the timekeeping hardware of each individual clock can be improved so that every system clock represents true time as accurately and precisely as possible for as long as possible. Alternatively, with another example approach, the time readings of the individual clocks can be suitably averaged to construct an ensemble timescale with each individual clock and oscillator determining its time and frequency offset from the ensemble. These two example approaches are not exclusive. A mix of both can also achieve satellite system timekeeping at workable levels of size, weight, and power (SWaP).

SUMMARY

In one aspect, a method for time-synchronization of a space-system includes designating, during a first period, a first satellite of the plurality of satellites as a master satellite. A clock of the master satellite is configured to provide time and frequency to remaining satellites of the plurality of satellites. The remaining satellites are designated as slave satellites. During a second period, a second satellite of the slave satellites is designated as the master satellite based on a performance indicator and the first satellite is designated as a slave satellite. During the first period and the second period, clocks of the slave satellites are cross-linked with a clock of the master satellite using time transfer. At least one satellite during the first period and the second period delivers time data comprising the time and the frequency generated by a clock of the at least one satellite.

In some variations, the slave satellites during each of the first period and the second period can periodically sync clocks of the slave satellites with the clock of the master satellite.

In other variations, the performance indicator can include a weighted frequency error having a smallest value among the slave satellites. The weighted frequency error can be calculated using: $X_\mu[nT_{MCT}] = w_\mu |\Delta x_\mu[nT_{MCT}]|$, where $X_\mu[nT_{MCT}]$ is the weighted frequency error, $w_\mu$ is a weighting parameter, $T_{MCT}$ is Master Cycle Time, $\Delta x_\mu[nT_{MCT}]$ is a frequency error estimator, and n is a number of $T_{MCT}$ intervals since time zero.

In some variations, the time transfer can include sending time data from each satellite to neighboring satellites and the time and the frequency can be determined based on a difference between two clocks of neighboring satellites.

In other variations, the time data can be delivered to at least one of a ground station, users on the ground, or users in space. The ground station can include an atomic clock configured to receive and interpret the time data.

In some variations, at least one of the clocks of the slave satellites or the clock of the master satellite can be a chip-scale atomic clock, a satellite atomic clock, a crystal-oscillator clock, or micro-resonator clock.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides space-system time synchronization algorithms that can be used to predict and/or understand how the system will respond to diverse, abnormal events (e.g., losing and then regaining a satellite-to-satellite communications link, loss of clock temperature control on a space vehicle, and the like). Use of the subject matter described herein can also minimize time errors across the satellites.

BRIEF DESCRIPTION OF THE DRAWINGS

Like reference symbols in the various drawings indicate like elements.

DETAILED DESCRIPTION

Simplification of space-system timekeeping algorithms is not only advantageous from a computational perspective, but also from a reliability perspective. A master/slave ensembling algorithm is described herein for satellite clocks. A constellation includes a series of satellites. One satellite in the constellation is designated as the master satellite, and all other satellites tie their time and frequency to the master satellite via crosslink time-transfer. After a designated time interval, such as a Master Cycle-Time, $T_{MCT}$, the master designation changes from one satellite to another. Over time compared to the Master Cycle-Time, $T_{MCT}$, the system's timekeeping variations are defined by an ensemble average of the satellite clocks. Additionally, the subject matter described herein provides workable and robust mitigation strategies for diverse system-threatening scenarios (e.g., solar flares, reductions of satellite bus voltage, loss of satellite-to-satellite crosslinks, etc.). The robustness is provided, in part, due to the multiple possible master satellites in each constellation as well as through the selection of a Master Time Cycle, $T_{MCT}$.

Figure 1:
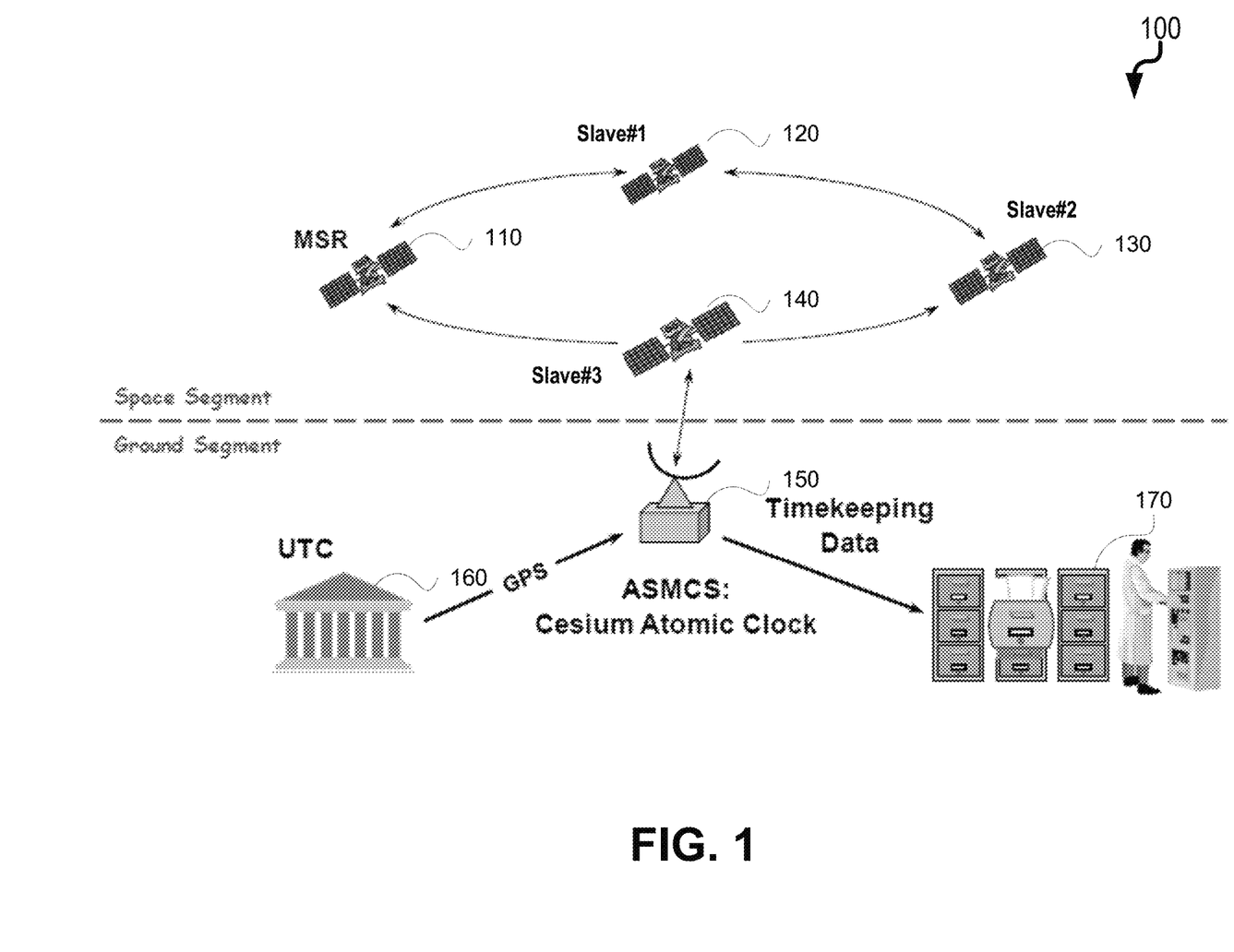
FIG. 1 illustrates an example system for master/slave ensembling.

FIG. 1 illustrates an example system architecture 100 for master/slave ensembling. System architecture 100 includes a constellation of satellites 110, 120, 130, 140 in outer space and a number of ground time keeping components such as a cesium atomic clock 150, Coordinated Universal Time (UTC) facility 160, and data repositories 170. The constellation works together to provide time for its own functioning and/or users on the ground (not shown). Each satellite has its own clock for time keeping. The satellites 110, 120, 130, 140 are each designated as either a master satellite or a slave satellite. In the example illustration in FIG. 1, satellite 110 is designated as the master satellite (e.g., MSR) and satellites 120, 130, 140 are designated as slave satellites. Using information passing along satellite cross-links, the satellites can synchronize their clocks with satellite 110 (e.g., the satellite designated as master) using two-way time transfer, for example, updating their clock readings approximately every $\tau_e$ seconds. The system architecture 100 follows a single clock at any particular instant, rather than combining and weighting the clocks across the constellation every moment as in traditional clock ensembling.

Every several hours or days (e.g., Master Cycle-Time, $T_{MCT}$), a new master satellite is designated based on a "best performing-slave" criterion among all constellation satellites 120, 130, 140, so that over time intervals long compared to Master Cycle-Time, $T_{MCT}$, the constellation follows a paper ensemble clock formed from the most stable constellation members. Clocks of satellites 120, 130, 140 designated as slave satellites synchronize their time and oscillator frequency to the clock of the satellite 110 designated as a master satellite. The clocks can be any type of appropriate clock such as a chip-scale atomic clock, a satellite atomic clock, a crystal-oscillator clock, or a micro-resonator clock. After passing of the Master Cycle-Time, $T_{MCT}$, (e.g., a period) one of the satellites 120, 130, 140 that is designated as a slave satellite is modified as the master satellite. The previous satellite designated as the master satellite (e.g., satellite 110) is re-designated as a slave satellite, as described in more detail in FIG. 2. Any satellite in the constellation can provide time data down to earth such as to a cesium atomic clock 150.

In some variations, the satellites 110, 120, 130, 140 can be a mixed constellation of chip-scale atomic clocks (CSACs) and nominal (ComSat) rubidium (Rb) space clocks. In other variations, all satellites 110, 120, 130, 140 can be CSACs.

Figure 2:
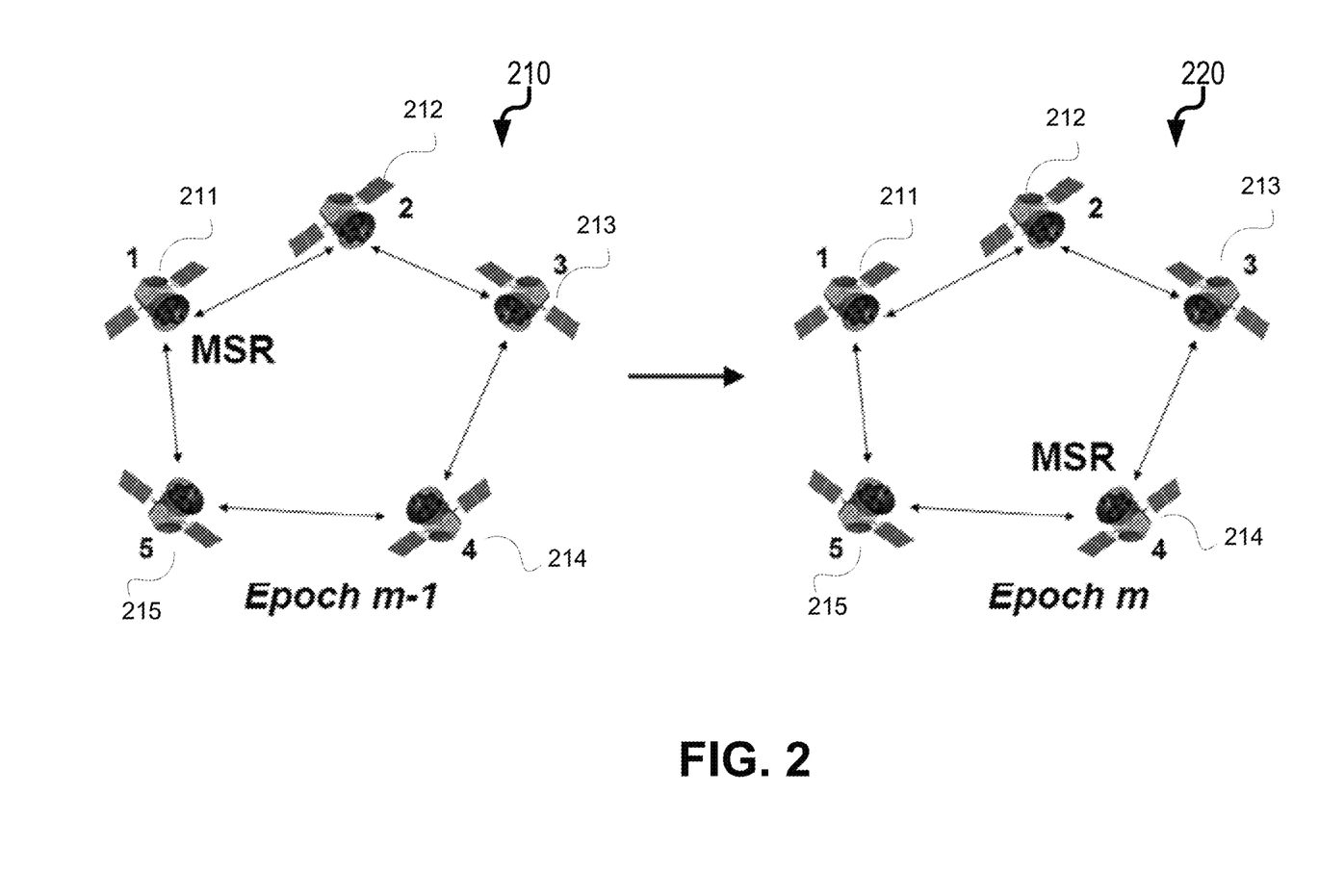
FIG. 2 illustrates example satellite designations between a first period and a second period.

FIG. 2 illustrates an example of satellite designations between a first period 210 and a second period 220. The time difference between each period 210, 220 can be the Master Cycle-Time, $T_{MCT}$. The Master Cycle-Time, $T_{MCT}$, can be set by an operator or optimized by software. As illustrated in FIG. 2, during the first period 210, satellite 211 is designated as the master satellite and all other satellites (e.g., satellites 212, 213, 214, 215) are designated as slave satellites. A clock of the satellite 211 designated as the master satellite is configured to provide time and frequency to satellites 212, 213, 214, 215 designated as slave satellites. Clocks of satellites 212, 213, 214, 215 (e.g., the designated slave satellites) with a clock of satellite 212 (e.g., the designated master satellite) are cross-linked using, for example, two-way time transfer, updating their clock readings approximately every $\tau_e$ seconds. Time data (e.g., time and frequency) can be generated by a clock of any satellite 211, 212, 214, 214, 215 of the constellation.

After passing of the Master Cycle-Time, $T_{MCT}$, during a second period 220, satellite 214 is designated as the master satellite and satellite 211 is designated as a slave satellite. Satellites 212, 214, and 215 remain designated as slave satellites. Satellite 214 is designated as the master satellite based on a "best performing-slave" criterion. It is noted that in the second period 220, satellite 211 may not remain designated as the master satellite as in the immediately preceding period (e.g., period 210), it was already a master satellite. In other words, the new master satellite is selected from the current satellites designated as slave satellites. A clock of the satellite 214 designated as the new master satellite is configured to provide time and frequency to satellites 211, 212, 213, 215 designated as slave satellites. Clocks of satellites 211, 212, 213, 215 (e.g., the designated slave satellites) with a clock of satellite 214 (e.g., the designated master satellite) are cross-linked using, for example, two-way time transfer, updating their clock readings approximately every $\tau_e$ seconds. Time data (e.g., time and frequency) can be generated by a clock of any satellite 211, 212, 213, 214, 215 of the constellation.

Figure 3:
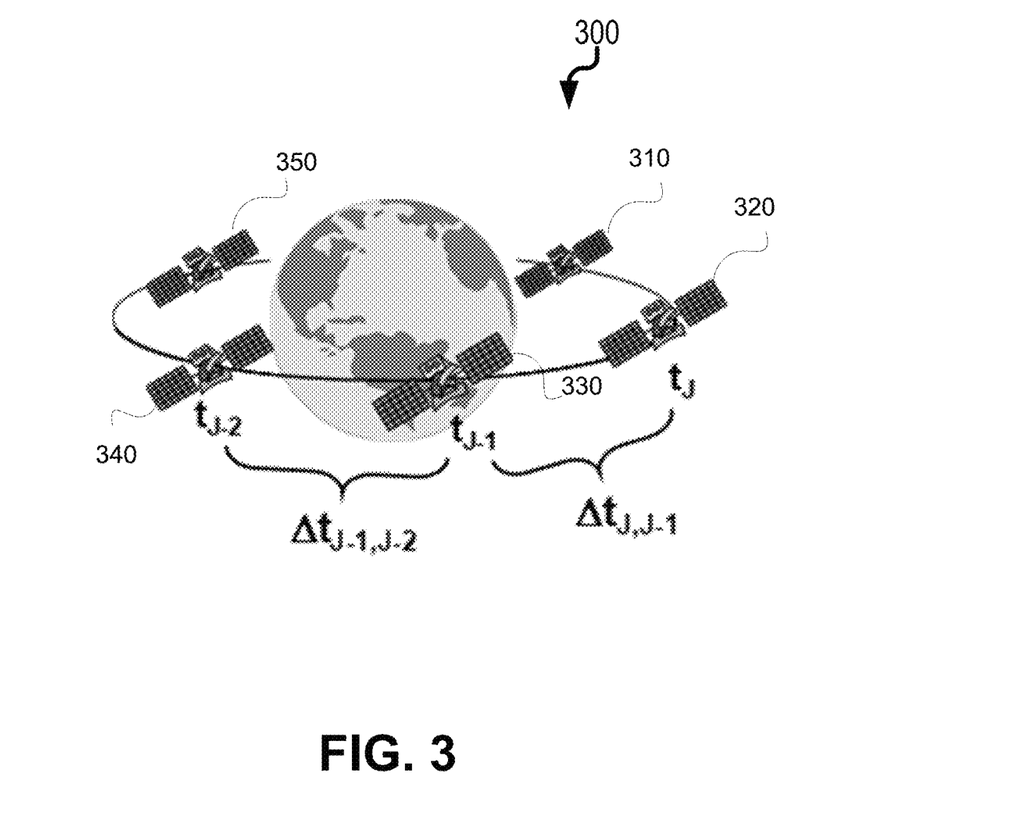
FIG. 3 illustrates an example satellite constellation in geosynchronous orbit with satellites exchanging time-offset information.

FIG. 3 illustrates an example satellite constellation 300 in geosynchronous orbit with the satellites exchanging time-offset information. Any number of satellite clocks can be in orbit around earth and share time offset information with each other via satellite crosslinks. For example, five satellites 310, 320, 330, 340, 350 are visible in FIG. 3. Using, for example, two-way time transfer satellite 320 can measure its time offset with respect to satellite 330 and can be expressed by the following:

$$\Delta t_{J,J-1} = t_J - t_{J-1}, \quad (1)$$

where J represents a first satellite (e.g., satellite 320) and J−1 represents a neighboring satellite (e.g., satellite 330). With two-way time transfer, both satellites transmit their own time and frequency to each other, and a time is determined based on the two transmitted signals. Additionally, in a cross-link message satellite 330 transmits its time offset relative to all other satellites, $\Delta t_{J-1,K}$, in the constellation such as satellites 310, 320, 340, 350 so that satellite 320 knows its time offset to all other satellites. Such an offset can be expressed by the following:

$$\Delta t_{J,K} = t_{J,J-1} - \Delta t_{J-1,K}, \quad (2)$$

where K represents a total number of satellites (e.g., 5 in FIG. 3). The time-offset between satellite 330 and satellite 340 can take place over several periods prior to the time-offset assessment between satellite 320 and satellite 330. The time differences, $\Delta t_{J,K}$, may not correspond to time differences between clocks measured at the same instant. For example, if the update time, $\tau_e$, is approximately equal to the time interval between crosslink message periods, then for some time, t, in the constellation's history, the following expression holds:

$$\Delta t_{J,J-1} = t_J[M\tau_e] - t_{J-1}[M\tau_e] \quad (3)$$

where $$t = M\tau_e \text{ and} \quad (4)$$

M represents the number of $\tau_e$ units in the time interval since the constellation was last synchronized by the ground (e.g., assuming all clocks are reset to zero time at ground synchronization). For example, if the time is one hour after synchronization from the ground and $\tau_e$ equals one second, then M is just 3600 (e.g., the number of seconds in an hour). If it takes some number of periods, q, to perform a two-way time-difference measurement, then the following expression holds:

$$\Delta t_{J,J-2} = \{t_J[M\tau_e] - t_{J-2}[(M-q)\tau_e]\} - \{t_J[M\tau_e] - t_{J-1}[(M-q)\tau_e]\}. \quad (5)$$

There may be a latency built into the determination of the time offset, $\Delta t_{J,K}$. The latency-effect can be overcome, however, if the following are true: (i) the largest value of $q\tau_e$ in the set of time offset, $\Delta t_{J,K}$, values corresponds to a time interval much smaller than the averaging time for clocks to display non-white frequency fluctuations and (ii) the largest value of $q\tau_e$ in the set of time offset, $\Delta t_{J,K}$, values corresponds to a time interval over which there is negligible deterministic variation in the clocks' frequencies.

Figure 4:
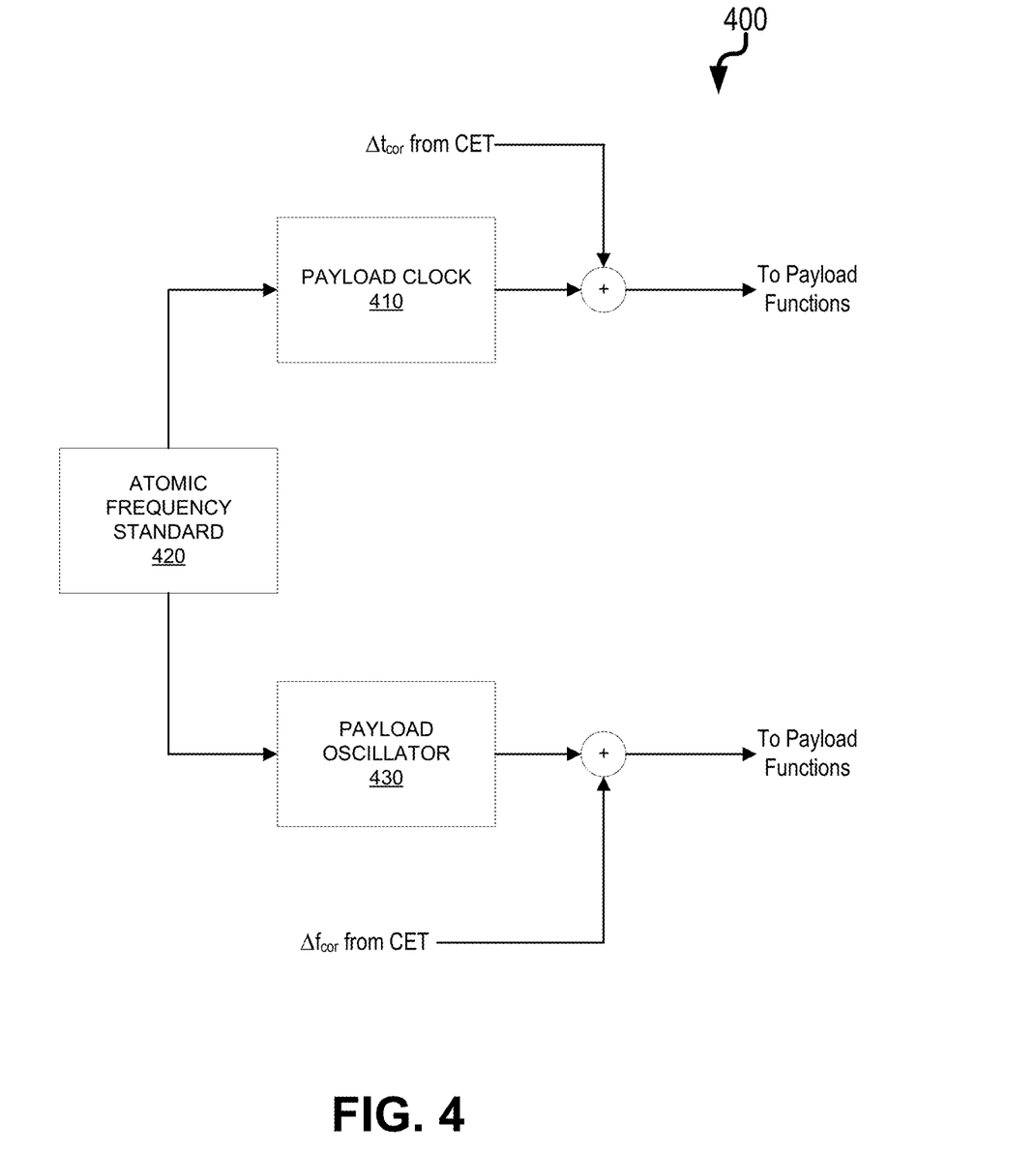
FIG. 4 illustrates a block diagram for one instantiation of an onboard payload timekeeping system.

FIG. 4 illustrates a block diagram for one instantiation of an onboard payload timekeeping system 400. The atomic frequency standard (AFS) 420 is free-running, and unaffected by time and frequency corrections meant to keep the satellite signals synchronized and syntonized to the Constellation Ensemble Timescale (CET). The payload oscillator 430 is stabilized by the AFS 420, but receives frequency corrections, $\Delta f_{cor}$, from the master/slave ensemble described in FIGS. 1-3. Similarly, the tick rate of payload clock 410 derives from the AFS 420, but it receives corrections, $\Delta t_{cor}$, every period, $\tau_e$, from the master/slave ensemble described in FIGS. 1-3. A satellite's AFS 420 references an external payload oscillator 430 for onboard functions and an external payload clock 410 defining the payload's timescale. The external payload oscillator 430 and the payload clock 410 can be adjusted to syntonize and synchronize payload functions to CET, and in this way the AFS 420 is free-running and statistically independent of all other satellite clocks in the constellation.

Every period, $\tau_e$, the slave satellite can compute the time offset, $\Delta t_{\mu,J}$, of its AFS 420 to the master using crosslink information, where the time offset can be represented by the following expression:

$$\Delta t_{\mu,J} = \delta_o(\mu,J) + \delta_r(\mu,J) + \delta_b(\mu,J), \quad (6)$$

where J represents the satellite designated as the master satellite, μ represents the satellite designated as the slave satellites, $\delta_o$ is the true time difference between the AFS clocks onboard satellites μ and J, $\delta_r$ is the random error arising from the crosslink time-transfer process between μ and J, and $\delta_b$ is the difference in bias between satellites μ and J. The standard deviation of the random error, $\delta_r$, of Q crosslinks between satellites μ and J can be expressed by the following:

$$\sqrt{Q}\sigma_r, \quad (7)$$

where $\sigma_r$ represents the standard deviation of the random error, $\delta_r$. Un-accounted for delays can occur in the transmit and receive signals for the two satellites (e.g., un-accounted for cable delays). These fixed time offsets, random from satellite-to-satellite, can contribute to the μ-to-J time-difference measurement in addition to time-transfer noise. The standard deviation of the difference in bias between satellites μ and J, $\delta_b$, can be expressed by the following:

$$\sqrt{2}\sigma_b, \quad (7)$$

where $\sigma_b$ represents the standard deviation of the bias error, $\delta_b$. Prior to correcting the payload clock 410, the time-offsets are quantized at a level, $\delta t_{quant}$, and can be expressed by the following:

$$\Delta t_{\mu,J}^{(q)} = \delta t_{quant} \times \left\lfloor \frac{\Delta t_{\mu,J}}{\delta t_{quant}} \right\rfloor, \quad (8)$$

where $\lfloor x \rfloor$ represents the floor-function of x (e.g., the integer nearest to x, not exceeding x). Corrections can be applied to the payload clock via exponential smoothing expressed by the following:

$$CET[M\tau_e,\mu] = (1-\lambda t)CET[(M-1)\tau_e,\mu] - \lambda_t \Delta t_{\mu,J}^{(q)}, \quad (9)$$

where CET [$M\tau_e,\mu$] is the realization of CET at time, $M\tau_e$, onboard satellite, μ, $\tau_e$ is a time-constant, and $\tau_e/\lambda_t$ is the exponential-smoothing time-constant. In Equation (9), $\lambda_t$ is effectively the smoothing time-constant and is dimensionless if units of time on one side of the equation are equal to units of time on the other side of the equation.

While corrections to the payload clock 410 can be applied every period (e.g., $\tau_e$), corrections to the payload oscillator 430 can be applied much less frequently. One way to accomplish this is to sum the corrections to the payload oscillator clock and then divide by the time interval over which the sum is taken.

To determine the new master for the upcoming Master Cycle-Time, $T_{MCT}$, an estimate of each satellite's rate of time-error accumulation over the $n^{th}$ $T_{MCT}$ is determined by considering the difference in integral time corrections between the last-half and first-half of $T_{MCT}$ as expressed by the following:

$$\Delta x_\mu[nT_{MCT}] \equiv \tag{10}$$

$$\frac{2}{K}\left(\sum_{j=\frac{K}{2}+1}^{K}\Delta t_{\mu,J}[(M-K+j)\tau_e] - \sum_{j=1}^{K/2}\Delta t_{\mu,J}[(M-K+j)\tau_e]\right),$$

where $$K = \frac{T_{MCT}}{\tau_e}. \tag{11}$$

These differences are then weighted to create a clock quality parameter $X_\mu$:

$$X_\mu[nT_{MCT}] = w_\mu|\Delta x_\mu[nT_{MCT}]| = \left(\frac{\langle\sigma_y^2\rangle}{\sigma_{y,\mu}^2}\right)x|\Delta x_\mu[nT_{MCT}]|, \tag{12}$$

where $w_\mu$ is a weight parameter that depends upon an Allan variance, $\sigma_{y,\mu}^2$, of the payload atomic clock 410 at an averaging time equal to approximately $$\frac{T_{MCT}}{2}, \text{ and} \tag{13}$$

$\langle\delta_y^2\rangle$ is the average of these Allan variances for all the potential satellites in the constellation that can be designated as master satellites (e.g., all satellites other than the one currently designated as the master satellite). The satellite with the smallest value of the "best performing-slave" criterion, $X_\mu[nT_{MCT}]$, excluding the present master, is designated as the new master satellite.

Figure 5A:
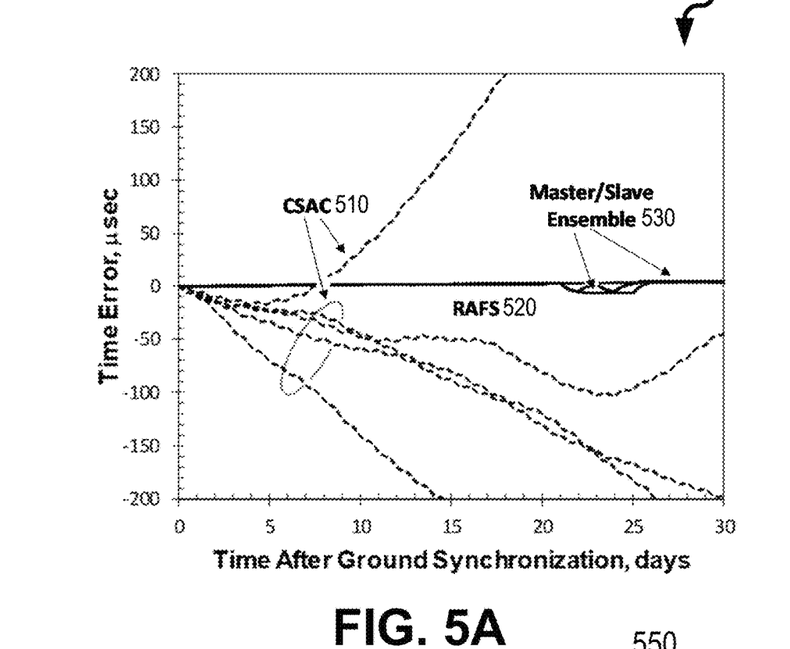
FIG. 5A illustrates a plot showing a master/slave ensemble for a constellation having five chip-scale atomic clocks and three ComSat clocks.
Figure 5B:
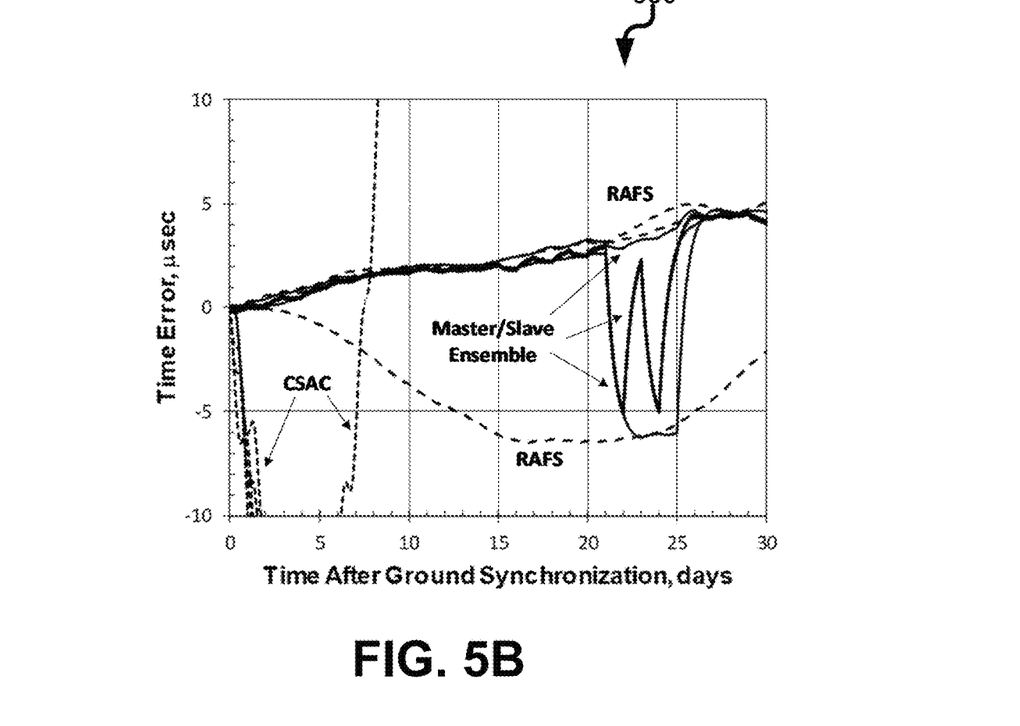
FIG. 5B illustrates a plot showing a zoomed in portion of the plot of FIG. 5A.

FIG. 5A illustrates a plot 500 showing a master/slave ensemble for a constellation having five CSAC clocks and three ComSat clocks. FIG. 5B illustrates a plot 550 showing a zoomed in portion of plot 500. Plot lines 510 represent free-running CSAC clocks. Plot lines 520 represent free-running ComSat clocks. Plot lines 530 represent the same clocks synchronized using the master/slave ensemble described in FIGS. 1-4. The saw-tooth pattern illustrated in FIG. 5B between days 21 and 25 corresponds to the correction of the CSAC clocks.

The constellation in the example illustrated in FIGS. 5A-5B include eight satellites: five CubeSats operating with CSACs and three geosynchronous satellites operating with communication-satellite atomic clocks. Parameters for these clocks are listed in Table 1 below. Considering a Master Cycle-Time, $T_{MCT}$, of approximately one day and that the satellite clocks experience diurnal temperature variations with an amplitude of approximately 5° C.; dy/dΘ is the temperature sensitivity of the satellite clock in units of fractional frequency change per degree Celsius. The phase of the diurnal cycle for each satellite is a random parameter, uniformly distributed between 0 and 2πc. The linear frequency drift coefficient, D, for each clock is normally distributed about the average drift rate for each family of clocks, $\langle D \rangle$. The standard deviation of this normal distribution equal to approximately $|\langle(D)\rangle|$.

TABLE 1

| Constellation Parameters | | | |
|---|---|---|---|
| Parameter | Value | Parameter | Value |
| CSAC: a | $1.0 \times 10^{-10}$ | CSAC: dy/dθ | $-2.0 \times 10^{-11}$/° C. |
| CSAC: b | $6.0 \times 10^{-14}$ | RAFS: dy/dθ | $3.0 \times 10^{-13}$/° C. |
| CSAC: $\langle D \rangle$ | $2.0 \times 10^{-12}$/day | Crosslink noise: $\sigma_r$ | 100 nsec |
| ComSat RAFS: a | $5.0 \times 10^{-12}$ | Crosslink bias: $\sigma_b$ | 50 nsec |
| Comsat RAFS: b | $3.0 \times 10^{-15}$ | $\delta t_{quant}$ | 25 nsec |
| ComSat RAFS: $\langle D \rangle$ | $2.0 \times 10^{-14}$/day | $\tau_e/\lambda_t$ | 12 hours, 3 days |
| $\delta T_{diurnal}$ | 5° C. | $T_{MCT}$ | 24 hours, 6 hours |

The Allan deviation for both the CSAC and the ComSat atomic clocks (e.g., ComSat rubidium atomic frequency standards: ComSat RAFS) are defined as follows:

$$\sigma_y(\tau) = \left[\frac{a^2}{\tau} + b^2\tau\right]^{1/2}, \tag{14}$$

where a and b are constants. The random time-transfer noise between satellites can be set at a tenth of this level (e.g., 0.1 μsec) and the bias can be set at one-half the random component. Additionally, since time-transfer between communications satellites can achieve levels of ±250 nsec (90% confidence interval), the quantization limit on time corrections can be set to one tenth this value. For the example illustrated in Table 1, $\tau e/\lambda_t$ can be set as $T_{MCT}/2$ (e.g., 12 hours). Time changes of a satellite clock can accrue relatively slowly after the designation of a new master satellite. Frequency changes can average over several different master identifications.

Figure 6:
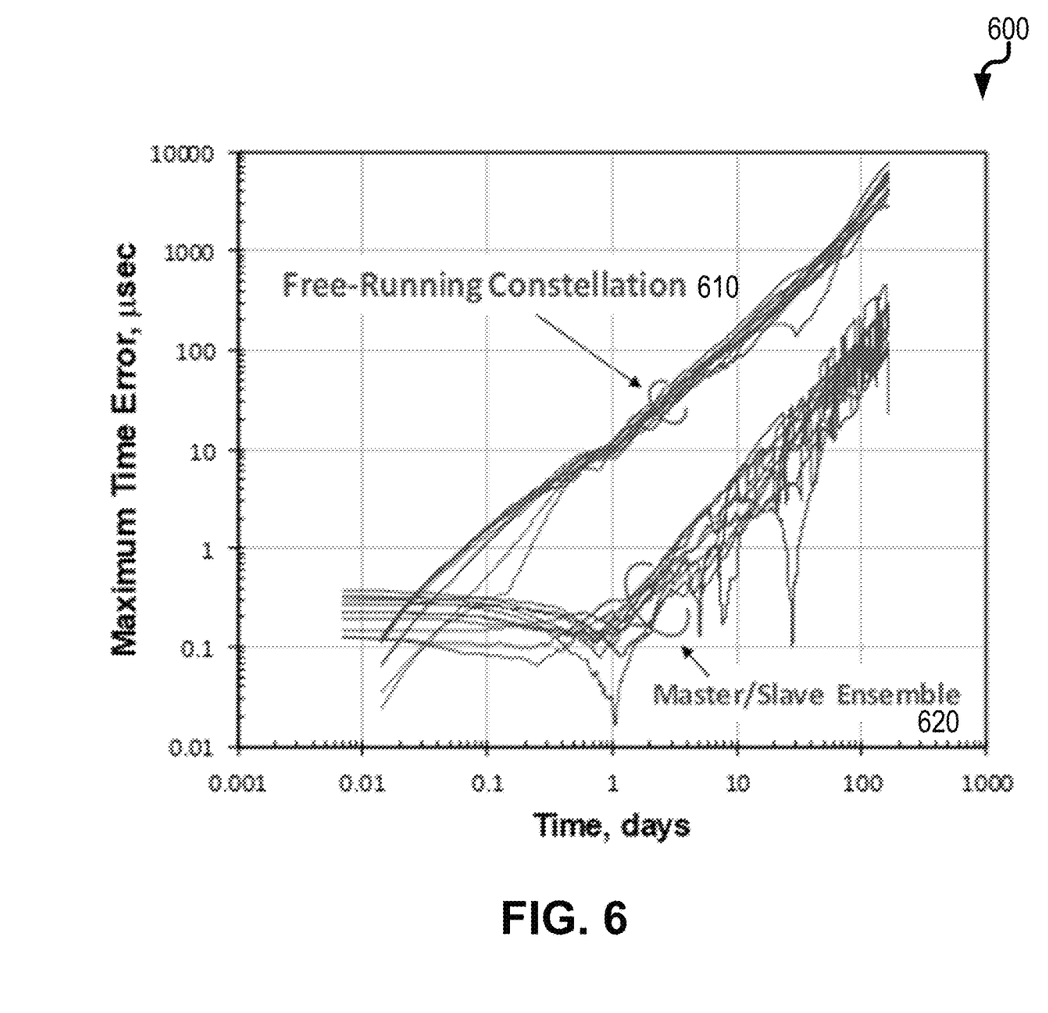
FIG. 6 illustrates a plot showing time-error buildup for the worst-performing constellation clock of an example constellation having both free-running clocks and the master/slave ensemble.

FIG. 6 illustrates a plot 600 showing time-error buildup for the worst-performing constellation clock of an example constellation having both free-running clocks and the master/slave ensemble. Data for eleven realizations are shown in FIG. 6, with each plot line (e.g., free-running or ensemble) corresponding to a unique realization. For the free-running constellation illustrated by plot lines 610, worst-case time-error buildup can come from the CSAC clocks in the constellation. With the master/slave ensemble described in FIGS. 1-4, the maximum time error can be reduced by an order of magnitude as illustrated by plot lines 620. The asymptote at short times after synchronization for the master/slave ensemble derives from the chosen values of crosslink time-transfer noise and bias.

Figure 7:
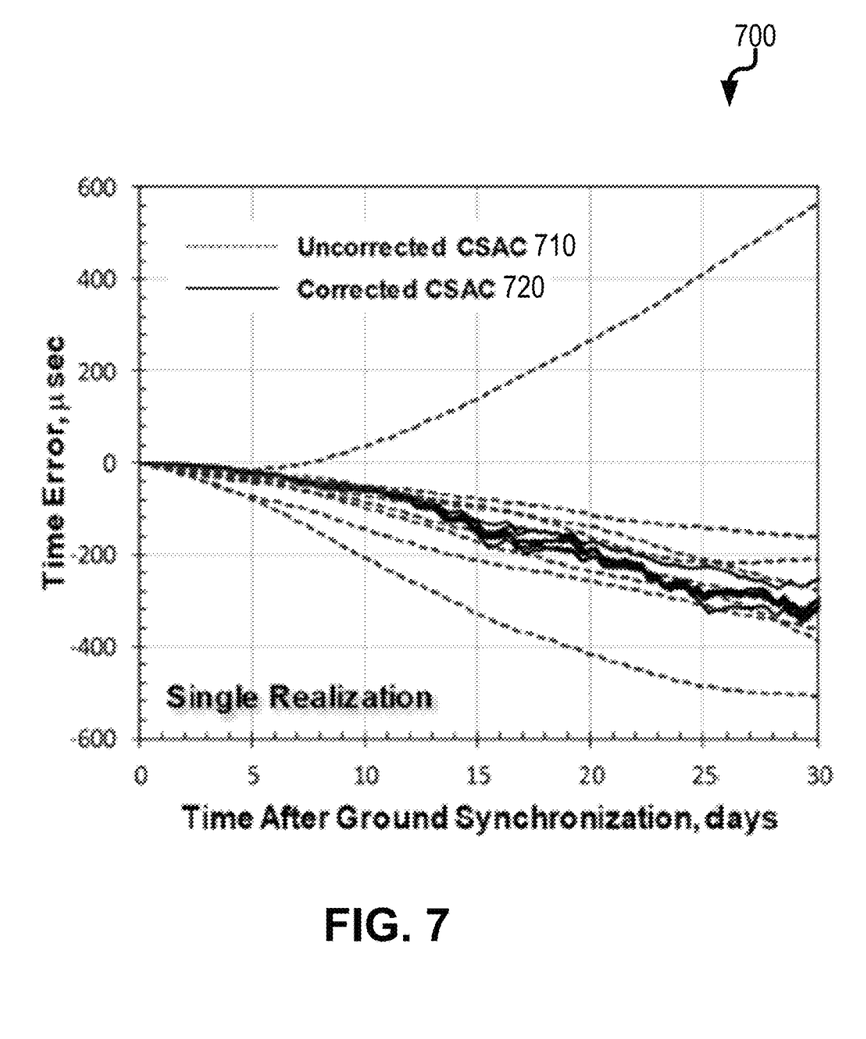
FIG. 7 illustrates a plot showing one realization of time-error build up for an example constellation having eight chip-scale atomic clocks satellites following synchronization and syntonization by the ground.

FIG. 7 illustrates a plot 700 showing one realization of time-error build up for an example constellation having eight CSAC satellites following synchronization and syntonization by the ground. Differing from the parameters described in Table 1 and FIGS. 5A-5B, with the constellation of solely CSAC satellites, the Master Cycle-Time, $T_{MCT}$, is approximately 6 hours as the CSACs build up time-error more rapidly than the ComSat clocks. Additionally, in order to provide more averaging over ensemble members, Teat can be approximately 3 days. Plot lines 710 illustrate the time-error that would have been accrued by the CSAC clocks if they had been free-running. Plot lines 720 illustrate the time-error buildup for these same clocks employing the master/slave ensemble algorithm described in FIGS. 1-4.

Figure 8:
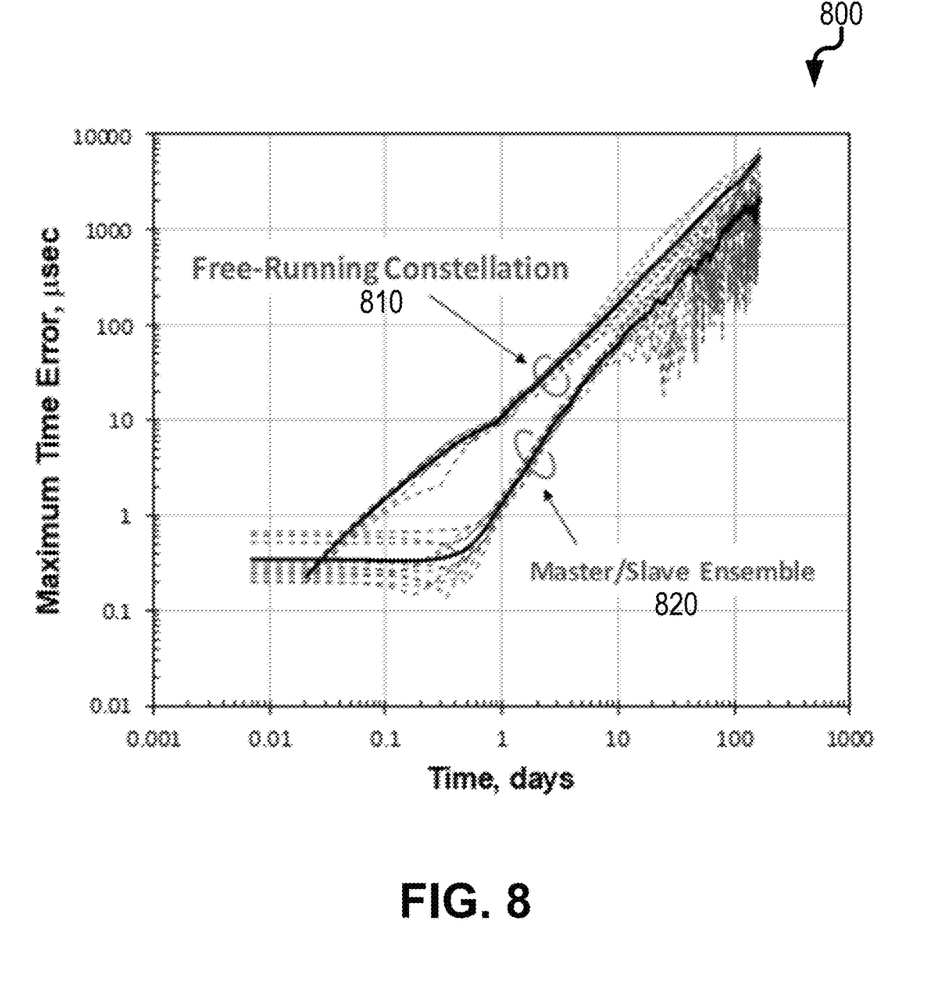
FIG. 8 illustrates a plot showing time-error buildup for the worst-performing satellite clock in the case of a constellation of eleven chip-scale atomic clocks.

FIG. 8 illustrates a plot 800 showing time-error buildup for the worst-performing satellite clock in the case of a constellation of eleven CSACs. Plot lines 810 illustrate the maximum time error associated with a free-running constellation. Plot lines 820 illustrate the maximum time error associated with the CSACs synchronized by the master/slave ensemble algorithm described in FIGS. 1-4. With this example constellation, one day after synchronization the worst-performing clock in the ensemble has a time-error an order-of-magnitude lower than the worst-clock under free-running conditions (e.g., the timekeeping improvement scales faster than $N^{1/2}$, where N is the number of clocks in the constellation). Of course at long times past synchronization compared to $\tau_e/\lambda_f$, the improvement for the Master/Slave ensemble scales $\sim N^{1/2}$. For this CSAC constellation having Table 1 parameters, the ground can re-synchronize the constellation once a day, knowing that re-synchronization would be at the level of ~1 µsec as opposed to 10 µsec for a constellation of free-running CSACs.

Figure 9:
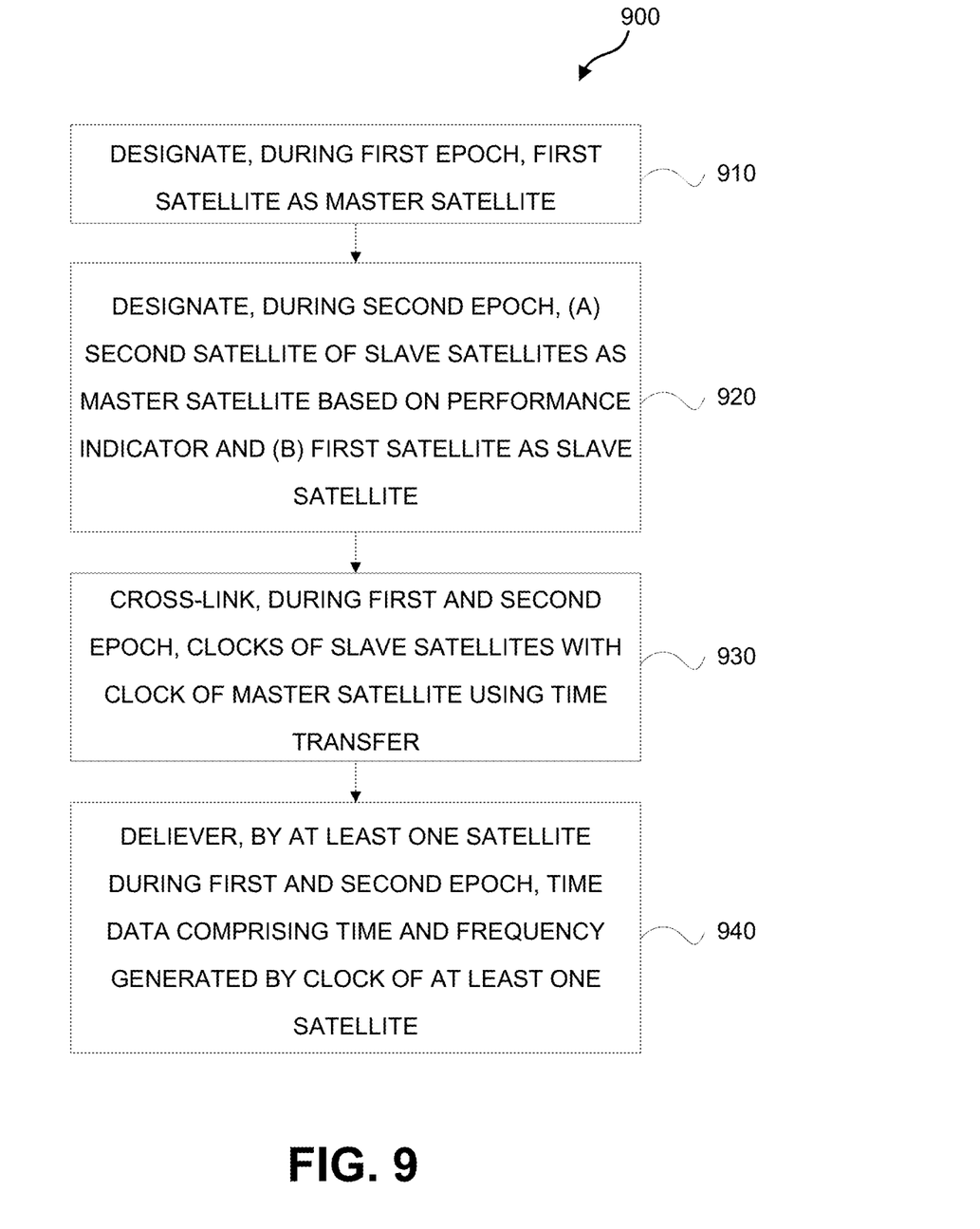
FIG. 9 illustrates an example flow chart for time-synchronization of a space-system having a plurality of satellites.

FIG. 9 illustrates an example flow chart 900 for time-synchronization of a space-system having a plurality of satellites. During a first period, a first satellite of the plurality of satellites is designated, at 910, as a master satellite. A clock of the master satellite is configured to provide time and frequency to remaining satellites of the plurality of satellites (e.g., any satellites not designated as master within the space-system). The remaining satellites that are not the master satellite are designated as slave satellites. During a second period, a second satellite of the slave satellites is designated, at 920, as the master satellite based on a performance indicator. The first satellite is designated, at 920, as a slave satellite. In other words, it is no longer the master satellite. During the first and second periods, clocks of the slave satellites are cross-linked, at 930, with a clock of the master satellite using, for example, two-way time transfer. At least one satellite during the first period and the second period delivers, at 940, time data including the time and the frequency generated by a clock of at least one satellite.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an un-recited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A method for time-synchronization of a space-system comprising a plurality of satellites, the method comprising:
designating, during a first period, a first satellite of the plurality of satellites as a master satellite, wherein (i) a clock of the master satellite is configured to provide time and frequency to remaining satellites of the plurality of satellites and (ii) the remaining satellites are designated as slave satellites;
after passing of a designated time interval, designating, during a second period, (a) a second satellite of the slave satellites as the master satellite based on a performance indicator and (b) the first satellite as a slave satellite;

cross-linking, during the first period and the second period, clocks of the slave satellites with a clock of the master satellite using time transfer; and delivering, by the master satellite or at least one of the slave satellites during the first period and the second period, time data comprising the time and the frequency generated by a clock of the master satellite or at least one of the slave satellites.

2. The method of claim 1, further comprising syncing, by the slave satellites during each of the first period and the second period, clocks of the slave satellites with the clock of the master satellite.

3. The method of claim 1, wherein the performance indicator comprises a weighted frequency error having a smallest value among the slave satellites.

4. The method of claim 3, wherein the weighted frequency error is calculated using: $X_\mu[nT_{MCT}]=w_\mu|\Delta x_\mu[nT_{MCT}]|$, where $X_\mu[nT_{MCT}]$ is the weighted frequency error, $w_\mu$ is a weighting parameter, the designated time interval is Master Cycle-Time $T_{MCT}$, $\Delta x_\mu[nT_{MCT}]$ is a frequency error estimator, and n is a number of $T_{MCT}$ intervals since time zero.

5. The method of claim 1, wherein the time transfer comprises sending time data from each satellite to neighboring satellites and the time and the frequency are determined based on a difference between two clocks of neighboring satellites.

6. The method of claim 1, wherein the time data is delivered to at least one of a ground station, users on the ground, or users in space.

7. The method of claim 6, wherein the ground station comprises an atomic clock configured to receive and interpret the time data.

8. The method of claim 1, wherein at least one of the clocks of the slave satellites or the clock of the master satellite comprises a chip-scale atomic clock.

9. The method of claim 1, wherein at least one of the clocks of the slave satellites or the clock of the master satellite comprises a satellite atomic clock.

10. The method of claim 1, wherein at least one of the clocks of the slave satellites or the clock of the master satellite comprises a crystal-oscillator clock.

11. The method of claim 1, wherein at least one of the clocks of the slave satellites or the clock of the master satellite comprises a micro-resonator clock.

12. The method of claim 1, wherein the first and second periods are the same length in time as one another.

13. The method of claim 1, wherein the designated time interval is set by an operator.

14. The method of claim 1, wherein the second satellite of the slave satellites is designated as the master satellite based on the performance indicator indicating that the second satellite is the best performing slave satellite.

15. A system for time-synchronization of a space-system comprising a plurality of satellites, the system comprising:
one or more data processors; and
memory storing instructions stored on at least one data processor, which when executed, result in operations comprising:
designating, during a first period, a first satellite of the plurality of satellites as a master satellite, wherein (i) a clock of the master satellite is configured to provide time and frequency to remaining satellites of the plurality of satellites and (ii) the remaining satellites are designated as slave satellites;
after passing of a designated time interval, designating, during a second period, (a) a second satellite of the slave satellites as the master satellite based on a performance indicator and (b) the first satellite as a slave satellite;
cross-linking, during the first period and the second period, clocks of the slave satellites with a clock of the master satellite using time transfer; and
delivering, by the master satellite or at least one of the slave satellites during the first period and the second period, time data comprising the time and the frequency generated by a clock of the master satellite or at least one of the slave satellites.

16. The system of claim 15, wherein the operations further comprise syncing, by the slave satellites during each of the first period and the second period, clocks of the slave satellites with the clock of the master satellite.

17. The system of claim 15, wherein the performance indicator comprises a weighted frequency error having a smallest value among the slave satellites.

18. The system of claim 17, wherein the weighted frequency error is calculated using: $X_\mu[nT_{MCT}]=w_\mu|\Delta x_\mu[nT_{MCT}]|$, where $X_\mu[nT_{MCT}]$ is the weighted frequency error, $w_\mu$ is a weighting parameter, $\Delta x_\mu[nT_{MCT}]$ is a frequency error estimator, the designated time interval is Master Cycle-Time $T_{MCT}$, and n is a number of $T_{MCT}$ intervals since time zero.

19. The system of claim 15, wherein the time transfer comprises sending time data from each satellite to neighboring satellites and the time and the frequency are determined based on a difference between two clocks of neighboring satellites.

20. The system of claim 15, wherein the time data is delivered to at least one of a ground station, users on the ground, or users in space.

21. The system of claim 20, wherein the ground station comprises an atomic clock configured to receive and interpret the time data.

22. The system of claim 15, wherein at least one of the clocks of the slave satellites or the clock of the master satellite comprises a chip-scale atomic clock, a satellite atomic clock, a crystal-oscillator clock, or a micro-resonator clock.

23. A non-transitory computer program product storing instructions which, when executed by at least one data processor forming part of at least one computing device, implement operations comprising:
designating, during a first period, a first satellite of the plurality of satellites as a master satellite, wherein (i) a clock of the master satellite is configured to provide time and frequency to remaining satellites of the plurality of satellites and (ii) the remaining satellites are designated as slave satellites;
after passing of a designated time interval, designating, during a second period, (a) a second satellite of the slave satellites as the master satellite based on a performance indicator and (b) the first satellite as a slave satellite;
cross-linking, during the first period and the second period, clocks of the slave satellites with a clock of the master satellite using time transfer; and
delivering, by the master satellite or at least one of the slave satellites during the first period and the second period, time data comprising the time and the frequency generated by a clock of the master satellite or at least one of the slave satellites.

* * * * *